United States Patent Office 3,803,091
Patented Apr. 9, 1974

---

3,803,091
NOVEL ALKYLIDENE BIS-AMIDES
Donald Leon Murfin, Mentor, Ohio, assignor to The Lubrizol Corporation, Wickliffe, Ohio
No Drawing. Filed Mar. 22, 1971, Ser. No. 126,875
Int. Cl. C07c 103/30
U.S. Cl. 260—561 N          6 Claims

ABSTRACT OF THE DISCLOSURE

Alkylidene bis-amides are prepared by reacting a carboxylic acid amide (especially acrylamide) with a ketal, alkenyl carboxylate or alkenyl sulfide in the presence of an acid catalyst. They are useful as chemical intermediates and as crosslinking monomers.

---

This invention relates to new compositions of matter, and more particularly to compounds of the formula

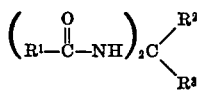

wherein each of $R^1$, $R^2$ and $R^3$ is a hydrocarbon or substituted hydrocarbon radical.

The term "hydrocarbon radical" as used herein includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cycloalkyl radical.

The following are illustrative of hydrocarbon radicals within the scope of this invention. Where a named radical has several isomeric forms (e.g., butyl), all such forms are included.

| | |
|---|---|
| Methyl | Tolyl |
| Ethyl | Xylyl |
| Propyl | Benzyl |
| Butyl | Cyclohexyl |
| Hexyl | Cyclopentyl |
| Octyl | Methylcyclopentyl |
| Decyl | Cyclopentadienyl |
| Vinyl | Vinylphenyl |
| Allyl | Isopropenylphenyl |
| Ethynyl | Cinnamyl |
| Propargyl | Naphthyl |
| Phenyl | |

—C₆H₃(C₂H₅)₂
—C₆H₄(CH₂)₁₁CH₃

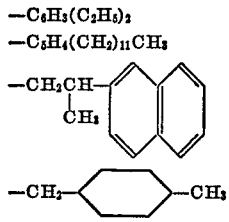

Many obvious variations of these radicals will be apparent to those skilled in the art and are included within the scope of the invention.

Substituted hydrocarbon, alkyl, aryl, etc., radicals are considered fully equivalent to the hydrocarbon, alkyl, aryl, etc., radicals and to be part of this invention. By "substituted" is meant radicals containing substituents which do not alter significantly the character or reactivity of the radical. Examples are:

Halide (fluoride, chloride, bromide, iodide)
Hydroxy
Ether (especially lower alkoxy)
Ester (especialy lower carbalkoxy)
Nitro
Cyano
Thioether
Sulfoxy
Sulfone In general, no more than about three such substituent groups will be present for each 10 carbon atoms in the radical.

Preferably, the hydrocarbon or substituted hydrocarbon radicals in the compounds of this invention have no more than about 30 carbon atoms, often no more than about 12 carbon atoms, and $R^1$ is free from acetylenic unsaturation while $R^2$ and $R^3$ are free from ethylenic and acetylenic unsaturation. A particular preference is expressed for lower hydrocarbon radicals, the word "lower" denoting radicals containing up to seven carbon atoms. Still more preferably, $R^1$ is a lower alkyl, alkenyl (especially vinyl) or aryl radical; $R^2$ is a lower alkyl or aryl radical; and $R^3$ is an alkyl radical having no more than 30 carbon atoms or a lower aryl radical. Alternatively,

is a lower cycloalkyl radical.

The following are illustrative of the compounds of this invention.

N,N'-isopropylidene-bis-propionamide

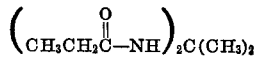

N,N'-isopropylidene-bis-acrylamide

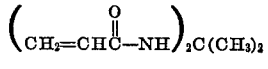

N,N'-(2-butylidene)-bis-acrylamide

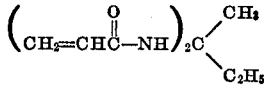

N,N'-(2-undecylidene)-bis-acrylamide

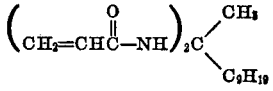

N,N'-(2-nonadecylidene)-bis-acrylamide

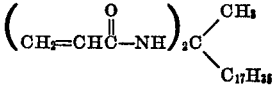

N,N'-(1-phenylethylidene)-bis-acrylamide

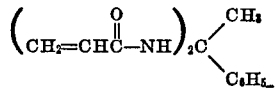

N,N'-diphenylmethylene-bis-acetamide

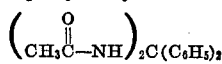

N,N'-diphenylmethylene-bis-acrylamide

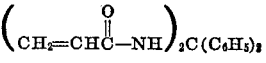

N,N'-cyclohexylidene-bis-acrylamide

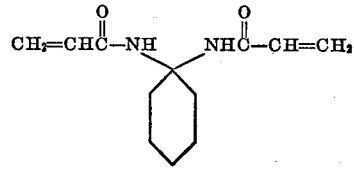

The compounds of this invention may be prepared by reacting an amide of the formula $R^1$—$CONH_2$ with a ketal of the formula

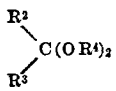

wherein $R^1$, $R^2$ and $R^3$ are as previously defined and $R^4$ is a lower alkyl or substituted lower alkyl radical, in the presence of an acidic catalyst. This reaction takes place under a wide variety of conditions and within a broad range of reactant ratios. It may often be effected by merely mixing the reagents and allowing them to stand, preferably with stirring or similar agitation, at room temperature for an hour or more, whereupon the desired product precipitates. In some instances the reaction may be facilitated if the reagents are dissolved in a suitable inert solvent such as an aliphatic or aromatic hydrocarbon or halogenated hydrocarbon, an ether or the like, and the resulting solution is heated to reflux. During the reaction, an alcohol of the Formula $R^4OH$ is liberated and this alcohol may frequently be conveniently moved by distillation, especially azeotropic distillation with the solvent employed. Occasionally, the reaction is advantageously carried out by heating the reactants at a temperature of 200–250° C., whereupon the alcohol is removed by distillation or evaporation. The product normally separates by precipitation or may be isolated by pouring the reaction mixture into water and extracting with a suitable solvent. It may then be purified by normal means such as distillation, recrystallization and the like.

The molar ratio of amide to ketal in the reaction mixture may be stoichiometric 2:1 ratio or even higher, sometimes as high as 8:1. On the other hand, it is frequently convenient to employ an excess of the ketal (up to a 10:1 molar excess in some instances). In general, best results are obtained when the molar ratio of amide to ketal is between about 3:1 and 1:3.

The acidic catalyst used in the preparation of the compounds of this invention may be a protonic acid such as sulfuric acid, p-toluenesulfonic acid, acetic acid, hydrochloric acid, phosphoric acid, trichloroacetic acid or the like, or it may be a Lewis acid such as boron trifluoride, zinc chloride, mercuric sulfate or the like. Preferred catalysts are sulfuric acid, p-toluenesulfonic acid and boron trifluoride.

The compounds of this invention may also be prepared by the reaction of an amide with an alkenyl ester of a carboxylic acid (e.g., isopropenyl acetate) or an alkenyl sulfide such as isopropenyl ethyl sulfide in the presence of an acidic catalyst. These reactions frequently proceed at temperatures of about 25–50° C., in a polar solvent such as an alcohol, ketone, ester or the like.

The preparation of the compounds of this invention is illustrated by the following examples.

EXAMPLE 1

A mixture of 73 grams (1 mole) of propionamide, 312 grams (3 moles) of 2,2 - dimethoxypropane, 7 ml. of a 0.07 M solution of p-toluenesulfonic acid in benzene, 150 ml. of methanol and 900 ml. of n-hexane is heated under distillation conditions as a methanol-hexane azeotropic mixture distills. The distillation temperature is 53–64° C. After 4 hours the reaction mixture is cooled, neutralized with aqueous ammonium hydroxide and diluted with 300 ml. of water. The desired N,N'-isopropylidene-bis-propionamide is removed by filtration, dried and recrystallized from Stoddard solvent. The results of elemental analysis are: carbon, 58.03% (theoretical 58.1); hydrogen, 9.74% (theoretical 9.81); nitrogen, 15.04% (theoretical 15.09).

EXAMPLE 2

Following the procedure of Example 1, a mixture of 213 grams (3 moles) of acrylamide, 312 grams (3 moles) of 2,2-dimethoxypropane, 18 ml. of 0.07 M p-toluenesulfonic acid solution in benzene, 50 ml. of methanol and 1500 ml. of n-hexane is distilled. After three hours, an additional 500 ml. of n-hexane is added and distillation is continued. The temperature of the reaction mixture during distillation is 61–65° C. The product is the desired N,N'-isopropylidene-bis-acrylamide.

EXAMPLE 3

Gaseous boron trifluoride is passed at room temperature, with stirring, into a mixture of 50 grams (0.7 mole) of acrylamide and 728 grams (7 moles) of 2,2-dimethoxypropane for 1 hour. A solid product separates and is removed by filtration, washed with aqueous ammonium hydroxide solution and dried. The product is the desired N,N'-isopropylidene-bis-acrylamide.

EXAMPLE 4

N,N'-isopropylidene-bis-acrylamide, prepared by the method of Example 3, is hydrogenated over a palladium-carbon catalyst. The product is N,N'-isopropylidene-bis-propionamide, identical with the product of Example 1.

EXAMPLE 5

A mixture of 100 grams (1 mole) of isopropenyl acetate, 142 grams (2 moles) of acrylamide, 5 grams of mercuric acetate, 10 grams of 98% sulfuric acid and 800 ml. of isopropanol is stirred overnight. An exothermic reaction occurs which causes the temperature to rise to about 30° C. The desired N,N'-isopropylidene-bis-acrylamide is removed by filtration and recrystallized from isopropanol.

EXAMPLE 6

A mixture of 8.5 grams (0.083 mole) of ethyl isopropenyl sulfide, 5.7 grams (0.08 mole) of acrylamide, 1 ml. of 1.0 M p-toluenesulfonic acid solution in benzene and 20 ml. of acetone is stirred for 24 hours at room temperature. The desired N,N'-isopropylidene-bis-acrylamide precipitates and is washed with acetone and recrystallized from isopropanol.

EXAMPLE 7

A mixture of 7.1 grams (0.1 mole) of acrylamide, 14.6 grams (0.1 mole) of 2,2-diethoxybutane, 50 ml. of 2-butanone and 2 drops of 100% sulfuric acid is stirred for 20 minutes, and then 100 ml. of ether is added. The desired N,N'-(2-butylidene)-bis-acrylamide precipitates and is collected by filtration, washed with ether and recrystallized from n-heptane.

EXAMPLE 8

Following the procedure of Example 1, a mixture of 213 grams (3 moles) of acrylamide, 145 grams (0.53 mole) of 2,2-di-n-propylundecane, 1.3 grams of p-toluenesulfonic acid, 1 gram of p-methoxyphenol, 10 ml. of methanol and 2000 ml. of cyclohexane is distilled until substantially all the methanol has been removed as a methanol-cyclohexane azeotrope. The desired N,N'-(2-undecylidene)-bis-acrylamide is recovered and recrystallized from benzene.

EXAMPLE 9

Following the procedure of Example 1, N,N'-(2-nonadecylidene)-bis-acrylamide is prepared from 21.3 grams (0.3 mole) of acrylamide, 38.4 grams (0.1 mole) of 2,2-dipropoxynonadecane, 15 ml. of methanol, 100 ml. of hexane, and 1 gram of p-toluene sulfonic acid.

EXAMPLE 10

Gaseous boron trifluoride is passed for 1 minute through a solution of 7.1 grams (0.1 mole) of acrylamide and 7.2 grams (0.05 mole) of 1,1-dimethoxycyclohexane in 250 ml. of ether, with stirring. The solution is then neutralized with aqueous ammonium hydroxide solution and the desired N,N'-cyclohexylidene-bis-acrylamide is removed by filtration, washed with water, dried and recrystallized from benzene.

EXAMPLE 11

A mixture of 222 grams (1 mole) of 1,1-dipropoxy-1-phenylethane, 142 grams (2 moles) of acrylamide, about 0.4 gram of p-toluenesulfonic acid, 2000 ml. of benzene and 1 gram of 2,6-di-t-butyl-p-cresol is heated under reflux as benzene and liberated ethanol are removed by distillation. When 1000 ml. of distillate has been removed, the mixture is cooled to room temperature and filtered. The remainder of the benzene is removed, yielding a red oil which is dissolved in chloroform and washed with dilute aqueous ammonium hydroxide. The organic layer is dried over sodium sulfate and concentrated, and the resulting solid is recrystallized from isopropanol to yield the desired N,N'-(1-phenylethyledene)-bis-acrylamide.

EXAMPLE 12

A mixture of 11.2 grams (0.05 mole) of diphenyldimethoxymethane and 11.8 grams (0.1 mole) of acetamide is heated to 110° C., whereupon the mixture fuses. Sulfuric acid, 1 ml. (96%), is added and the mixture is heated to 200° C. as methanol is removed by distillation. The product is cooled, washed with aqueous ammonium hydroxide solution, benzene and methanol, and recrystallized from methanol to yield the desired N,N'-diphenylmethylene-bis-acetamide.

EXAMPLE 13

A mixture of 228 grams (1 mole) of diphenyldimethoxymethane, 213 grams (3 moles) of acrylamide, 3 grams of p-toluenesulfonic acid and 2 grams of p-methoxyphenol is dissolved in benzene and water and methanol are removed by azeotropic distillation. After 4½ days, the reaction mixture is cooled to room temperature and poured into aqueous ammonium hydroxide solution. The benzene is removed by evaporation and the desired N,N'-diphenylmethylene-bis-acrylamide is removed by filtration, washed with acetone, dried and recrystallized from chloroform.

Compounds of this invention wherein $R^1$ is, for example an alkyl or aryl radical are useful intermediates for the preparation of enamides. For example, N,N'-isopropylidene-bis-acetamide may be pyrolyzed at about 220–250° C., under vacuum, whereupon the following reaction occurs:

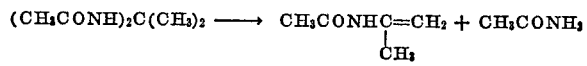

The resulting N-isopropenylacetamide may be reacted with a wide variety of chemical compounds to yield useful products including addition polymers.

Compounds of this invention wherein $R^1$ is an alkenyl (especially vinyl) radical may be polymerized under free-radical conditions, either alone or in the presence of other monomers. The term "polymer," as used herein, includes addition homopolymers, copolymers, terpolymers and other interpolymers.

Polymerization by the free-radical method may be effected in bulk, solution, suspension or emulsion, by contacting the monomer or monomers with a polymerization initiator either in the absence or presence of a diluent at a temperature of about 0–200° C. Suitable initiators include benzoyl peroxide, tertiary butyl hydroperoxide, acetyl peroxide, hydrogen peroxide, azobis-isobutyronitrile, persulfate-bisulfite, persulfate-sodium formaldehyde sulfoxylate, chlorate-sulfite and the like. Depending on the monomer system used, solution, suspension or emulsion polymerization may be effected in such polar solvent systems as water and mixtures of water with alcohols or other hydroxylated organic solvents. Solution polymers may additionally be prepared in solvents (e.g., alcohols and ethers such as tetrahydrofuran, ethylene glycol, diethylene glycol, ethers thereof and the like).

Suitable emulsifiers for use in the preparation of emulsion polymers of this invention include cationic materials such as stearyl dimethyl benzyl ammonium chloride; non-ionic materials such as alkyl aryl polyether alcohols and sorbitan mono-oleate; anionic materials such as sodium decylbenzene sulfonate, dioctyl sodium sulfosuccinate, sodium salts of alkyl aryl polyether sulfates, and sodium lauryl sulfate; alkali metal salts of lignosulfonic acids, silicic acids and the like; and colloidal materials such as casein, sodium polyacrylate, carboxymethylcellulose, hydroxyethylcellulose, gum tragacanth, sodium alginate, gelatin, methylcellulose, gum arabic, dextrins or polyvinyl alcohol.

A large variety of polymerizable compounds can be used to form interpolymers with the compounds of this invention. They include (1) esters of unsaturated alcohols, (2) esters of unsaturated acids, (3) esters of unsaturated polyhydric alcohols, (4) vinyl cyclic compounds, (5) unsaturated ethers, (6) unsaturated ketones, (7) unsaturated amides, (8) unsaturated aliphatic hydrocarbons, (9) vinyl halides, (10) unsaturated acids, (11) unsaturated acid anhydrides, (12) unsaturated acid chlorides, and (13) unsaturated nitriles. Specific illustrations of such compounds are:

(1) Unsaturated alcohols and esters thereof: (a) Allyl, methallyl, crotyl, 1-chloroallyl, 2-chloroallyl, cinnamyl, vinyl, methylvinyl, 1-phenallyl, butenyl alcohols, and ester of such alcohols with (b) saturated acids such as acetic, propinonic, butyric, valeric, caproic and stearic; (c) unsaturated acids such as acrylic, alpha-substituted acrylic (including alkylacrylic, e.g., methacrylic, ethylacrylic, propylacrylic, etc., and arylacrylic such as phenylacrylic), crotonic, oleic, linoleic and linolenic; (d) polybasic acids such as oxalic, malonic, succinic, glutaric, adipic, pimelic, suberic, azelaic and sebacic; (e) unsaturated polybasic acids such as maleic, fumaric, citraconic mesaconic, itaconic, methylenemalonic, acetylenedicarboxylic, and aconitic; (f) aromatic acids, e.g., benzoic, phenylacetic, phthalic, terephthalic and benzoylphthalic acids.

(2) Esters of saturated alcohols, such as methyl, ethyl, propyl, isopropyl, butyl, isobutyl, sec-butyl, tert-butyl, 2-ethylhexyl, cyclohexyl or behenyl alcohols, with unsaturated aliphatic monobasic and polybasic acids, examples of which are illustrated above.

(3) Esters of unsaturated polyhydric alcohols, e.g., butenediol, with saturated and unsaturated aliphatic and aromatic, monobasic and polybasic acids, illustrative examples of which appear above.

(4) Vinyl cyclic compounds including styrene, o-, m-, p-chlorostyrenes, bromostyrenes, fluorostyrenes, methylstyrenes, ethylstyrenes and cyanostyrenes; di-, tri-, and tetra-chlorostyrenes, bromostyrenes, fluorostyrenes, methylstyrenes, ethylstyrene, cyanostyrene; vinylnaphthalene, vinylcyclohexane, divinylbenzene, trivinylbenzene, allylbenzene, and heterocycles such as vinylfuran, vinylpyridine, vinylbenzofuran, N-vinylcarbazole, N-vinylpyrolidone and N-vinyloxazolidone.

(5) Unsaturated ethers such as methyl vinyl ether, ethyl vinyl ether, cyclohexyl vinyl ether, octyl vinyl ether, diallyl ether, ethyl methallyl ether and allyl ethyl ether.

(6) Unsaturated ketones, e.g., methyl vinyl ketone and ethyl vinyl ketone.

(7) Unsaturated amides, such as acrylamide, methacrylamide, N-methylacrylamide, N-phenylacrylamide, N-allylcrylamide, N-methylol-acryamide (N-allylcaprolactam, diacetone acrylamide and 2-acrylamido-2-methylpropanesulfonic acid.

(8) Unsaturated aliphatic hydrocarbons, for instance, ethylene, propylene, butene, butadiene, isoprene, 2-chlorobutadiene and alpha-olelns in general.

(9) Vinyl halides, e.g., vinyl fluoride, vinyl chloride, vinyl bromide, vinylidene chloride, vinylidene bromide, allyl chloride and allyl bromide.

(10) Unsaturated acids (for example, acrylic, methacrylic, propylacrylic), examples of which appear above.

(11) Unsaturated acid anhydrides, e.g., maleic, citraconic, itaconic, cis-4-cyclohexene-1,2-dicarboxylic and bicyclo-(2,2,1)-5-heptene-2,3-dicarboxylic anhydride.

(12) Unsaturated acid halides such as cinnamoyl, acrylyl, methacrylyl, crotonyl, oleyl and fumaryl chorides or bromides.

(13) Unsaturated nitriles, e.g., acrylonitrile, methacrylonitrile and other substituted acrylonitriles.

The polymerizable compounds of this invention are particularly useful as crosslinking agents for the formation of rigid polymers which may be used as molding compositions, ion exchange resins and the like.

What is claimed is:

1. A method for preparing a compound of the formula

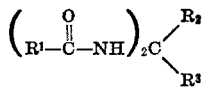

wherein each of $R^1$, $R^2$ and $R^3$ is a hydrocarbon radical, which comprises reacting an amide of the Formula $$R^1\text{—}CONH_2$$

with a ketal of the Formula

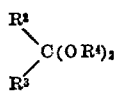

wherein $R^4$ is a lower alkyl radical, in the presence of an acidic catalyst.

2. A method according to claim 1 wherein $R^1$ is a lower alkyl, alkenyl or aryl radical; $R^2$ is a lower alkyl or aryl radical; and $R^3$ is an alkyl radical having no more than 30 carbon atoms or a lower aryl radical; or

is a lower cycloalkyl radical.

3. A method according to claim 2 wherein $R^1$ is a vinyl radical.

4. A method according to claim 3 wherein the acidic catalyst is sulfuric acid, p-toluenesulfonic acid or boron trifluoride.

5. A method according to claim 4 wherein each of $R^2$ and $R^3$ is a lower alkyl radical.

6. A method according to claim 5 wherein each of $R^2$ and $R^3$ is methyl.

References Cited
UNITED STATES PATENTS

| | | | |
|---|---|---|---|
| 2,997,391 | 8/1961 | Murray et al. | 96—35 |
| 2,475,846 | 7/1949 | Lundberg | 260—561 |
| 3,539,629 | 11/1970 | Mackellar et al. | 260—561 |
| 3,280,189 | 10/1966 | Cline, Jr. | 260—561 |

U.S. Cl. X.R.

260—23 CP, 66, 78.5 R, 80.3 N, 82.1, 85.5 AM, 87.5 R, 88.1 PN, 89.7 R, 558 R, 561 R, 562 R

LEWIS GOTTS, Primary Examiner

E. G. LOVE, Assistant Examiner